July 2, 1963 F. Z. DAUGHERTY ETAL 3,096,451
ELECTRIC MOTOR ASSEMBLY
Filed Feb. 11, 1960 2 Sheets-Sheet 1

*INVENTORS.*
FRANK Z. DAUGHERTY &
ALBERT L. SEBOK
BY *Williams, Tilbury +*
*Golrick*

ATTORNEYS

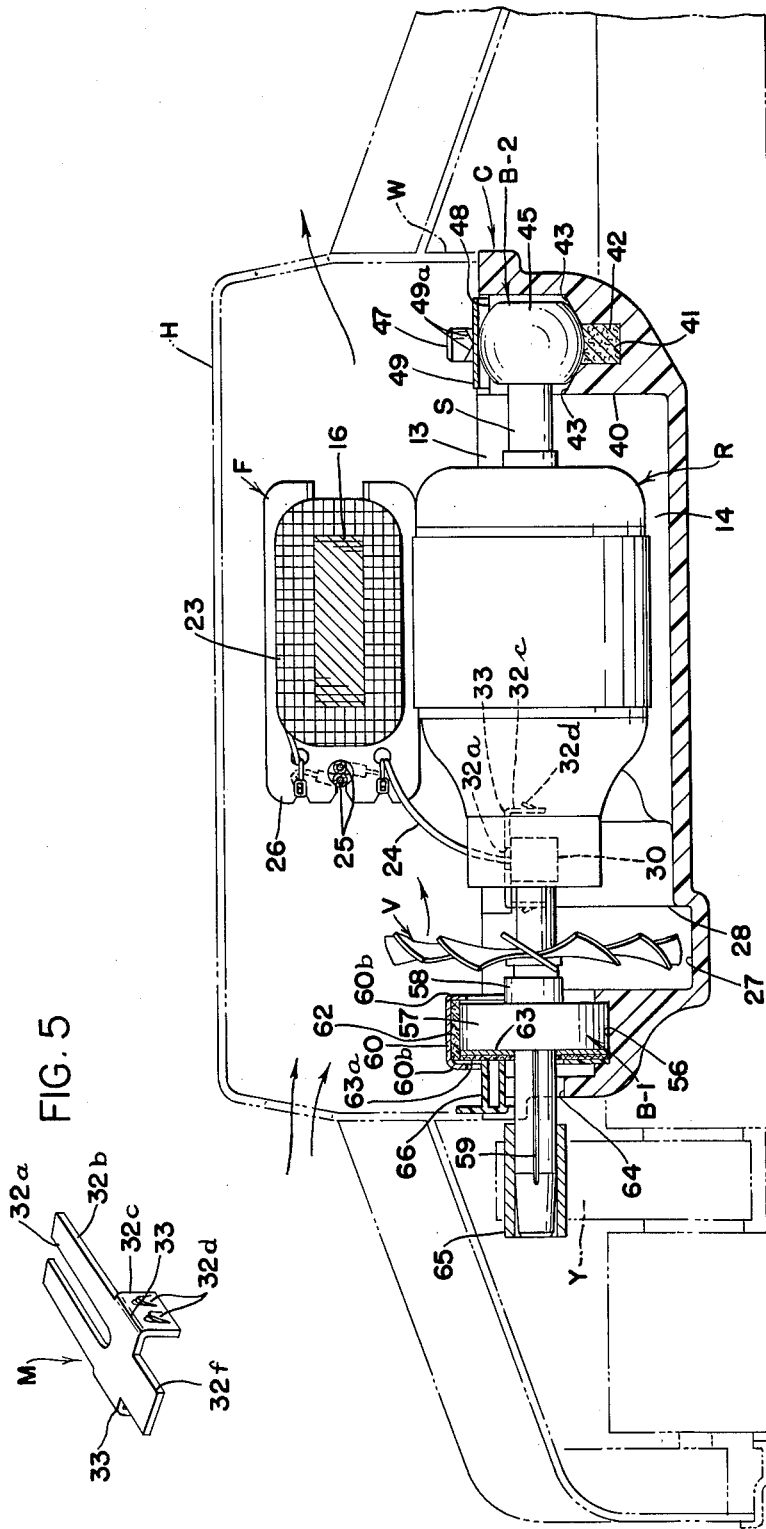

United States Patent Office 3,096,451
Patented July 2, 1963

3,096,451
ELECTRIC MOTOR ASSEMBLY
Frank Z. Daugherty, Kent, and Albert L. Sebok, Akron, Ohio, assignors to Ametek, Inc., New York, N.Y., a corporation of Delaware
Filed Feb. 11, 1960, Ser. No. 8,011
16 Claims. (Cl. 310—42)

The present invention is concerned with a novel manner of assembling the components of an electric motor; and more particularly with structure of a fractional horse-power motor intended to be mounted in an environment which provides in effect a part of a casing enclosing the components.

Though adapted to other applications, the motor unit which is the subject of this invention will be described as used in an agitator type vacuum cleaner "nozzle" such as that now frequently used with canister vacuum cleaners. Further the invention will be described as embodied in a commutating motor unit, yet certain features may be advantageously used in other non-commutating small motors such as shaded-poled motors.

In the case of an agitator vacuum cleaner nozzle used with a canister type cleaner, the nozzle is provided with an elongated handle for manipulation after the fashion of old style vacuum sweepers, and the vacuum head or nozzle proper includes a work or rug-agitating rotary brush belt driven by a motor in the nozzle itself. However, since the vacuum or suction action is produced in the canister itself by a motor fan unit or air pump connected by a hose or flexible tube to the work-contacting nozzle, the agitator driving motor in the nozzle may be of much smaller size than the usual vacuum sweeper motor having the dual function of driving a work agitating brush and also a vacuum producing fan. Or on the other hand, the agitator in the nozzle may be driven by a motor of higher power than hitherto used, if the size required in the higher powered motor unit or in the nozzle accommodating the same can be kept within acceptable limits.

By the present invention, a novel combination of a motor base or frame member, motor stator and mounting of the stator in the frame, and rotor supporting means—and other motor elements—is proposed, whereby a simple unitary assembly of essential motor components is advantageously provided which is adapted to ready incorporation as a unit in the environment of use, such as an agitator vacuum nozzle. Also, in combination with the basic or ordinary structure of the nozzle or other environment, perhaps at times slightly modified, the motor unit of this invention offers the advantageous possibility of size reduction in an overall device in which used, or alternatively increased performance for a given size.

These and other advantageous features and objects of the invention will appear from the following description and drawings wherein:

FIG. 4 is generally a longitudinal or axial section of the motor unit, with environmental structure fragmentarily represented by dashed lines; and FIG. 5 is an enlarged detail of a brush retaining clip structure used in a commutating type unit.

Figure 1:
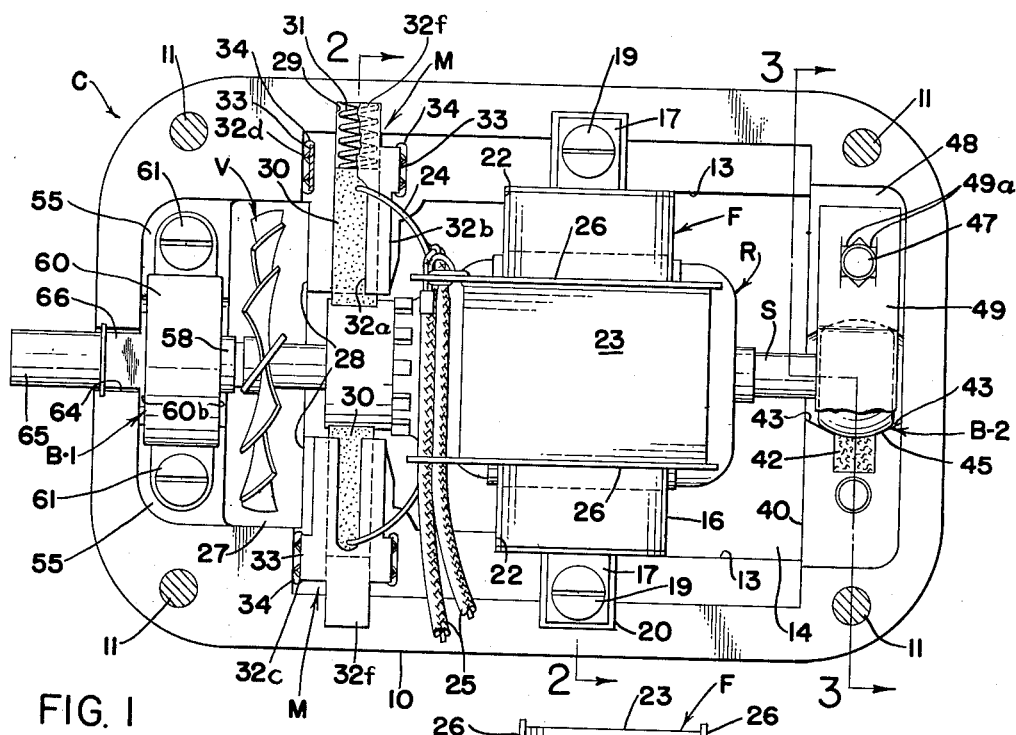
FIG. 1 is a plan view of a motor unit or assembly representing one embodiment of the invention.

The principal parts of the unit (see FIGS. 1 and 4) are a half-shell casing member C, moulded of plastic insulating material and intended to be bolted to the bottom of an internal wall flange W of an agitated vacuum cleaner nozzle housing H involving a rotary agitating brush A belt driven from the motor; a stator or field unit F; a rotor R—here an armature since a commutating motor is represented in the drawings—having opposite ends of its shaft S supported in bearing structures B-1 and B-2; a ventilating fan V on the shaft between bearing B-1 and the commutator; and brush and brush mounting structures at M, M. The member C provides a base or frame for mounting all other motor components in proper mutual relations in a unit independently of other structure which in the environment of use may provide a further enclosure for such components.

The half-casing C, symmetrical about a vertical axial plane, has the lower exterior and end surfaces generally smoothly rounded with any prominences merging into adjacent areas to avoid as far as possible locations where dirt might lodge; and includes a flange 10, perforated at the four corners for mounting bolts or screws 11 threaded upwardly into housing H, and having a flange flat top surface bearing on the bottom edge of the internal integral depending skirt or wall W.

A large central recess or hollow extending over the major part of the casing is defined by opposed straight parallel side wall portions 13 terminating in respective sloping straight portions 14 which in turn merge into a central curved bottom portion at 15 to accommodate the field lamination stack 16 clamped in place by stator anchor means including screw-held perforated clips 17. Each clip has an inner edge bearing on a longitudinal horizontal bottom shoulder of a corresponding groove 18 and is secured by a self-tapping clamp screw 19 threaded into a respective blind apertured pad or boss 20 integrally formed on the casing inward from the flange edge.

It will be noted (FIG. 2) that the stack is of roughly inverted U-shape with the legs of the U forming two poles; and that on opposite sides the external form of each pole includes a straight vertical side and oblique bottom surface complementary in mutual disposition to the adjacent casing wall surfaces. The oblique surfaces terminate short of the curved casing portion 15, so that in effect the vertical clamping forces wedge the stack into the convergent bottom of the casing. Preferably the obtuse corner between adjacent vertical and oblique stack surfaces is relieved as at 16a to further wedging action. The complementary sidewalls of the casing terminate endwise at the right (in FIG. 1) in a vertical wall 40 forming part of receiving structure for bearing B-2, at the left in vertical shoulders at 22 for locating the stack.

It may be further noted that the stack laminations are held together by a longitudinal welding bead laid at 18a along the outside corner of the sloping upper wall of groove 18 after the laminations are properly aligned and tightly compressed in assembly operations. The field coil 23 on the yoke portion of the U-shaped field is wound on an insulating bobbin having parallel end projections 26 perforated for securement of the coil ends, brush leads 24 and power leads 25.

Between the recess for the field and the short approximately semi-cyclindrical recess or well 27 for the fan V, inwardly extending integral formations 28, with top surfaces relieved below the main top level of the casing or flange, are provided with opposed square slots 29, having aligned centerlines in a horizontal plane through the shaft axis, in which slots square carbon brushes 30 disposed radially to the commutator and brush bias springs 31 are held by formed spring steel brush retaining clip plates 32. The shape of a clip is shown in detail FIG. 5, wherein the thickness of the metal is exaggerated for clarity. Each clip, somewhat cruciform in plan outline, has a flat main body portion 32b adapted to cover and overlap the brush slot; a longitudinal slot 32a to accommodate the brush lead 24 and permit the brush to move toward the commutator as it wears in use; and a pair of short downwardly bent parallel ears 32c barbed at 32d which are received in respective deep narrow parallel slots 34 disposed on opposite sides of the brush slot for retaining the clip in brush slot covering relation. Since the outer end of each slot extends beyond the relieved surface of formation 28 into the adjacent casing flange region, the corresponding end 32f of the brush clip is reduced in width to be received in the upward extension of the slot in this region.

The right end casing wall 40 has a narrow semi-circular recess 41 centered about the shaft axis to receive a correspondingly shaped oil-wick felt 42, on opposite sides of which recess a pair of semi-circularly extending seats 43, 43 each a portion of a conical surface, are provided for spherical surface portions on the self-aligning sleeve bearing 45 rotatably supporting the end of the shaft. The bearing 45 is a known type of lubricant impregnated sintered metal. On a pair of integrally molded parallel studs 47 projecting from the shallow horizontally relieved surface 48, a Tinnermann type spring metal bearing retainer clip 49 is engaged, the middle part of the clip having a slight upwardly formed bow to aid in centering the bearing. The upwardly struck or slightly offset opposed pairs of tongues 49a with spaced sharply sheared V-notched ends permit respective studs 47 to enter therebetween as the clip is pressed downwardly thereon; but by digging into the plastic upon any tendency to upward movement of the clip, the ends firmly engage the studs.

The left end wall of the casing is recessed at 55 on opposite sides of the shaft below the level of the flange, approximately to the level of a horizontal axial plane, and a further short semi-cyclindrical recess 56 provides a seat for the outer race 57 of a ball bearing unit. Between the inner race of the bearing and the shaft S a sintered powdered metal sleeve is interposed. Equally spaced longitudinally grooved formations 59, say four, are cut into the shaft by a pointed grooving tool to raise adjacent spline-like longitudinal burrs, so that when the shaft is pressed into a sleeve already press-fitted into the bearing, frictional engagement of the grooved shaft and sleeve retains the rotor in proper position relative to the bearing B-1 and hence the casing. Grooving of the shaft similarly may be used to maintain the fan, commutator, and armature stack in place.

A bearing clamp 60 of semi-cylindrical form, held by self-tapping screws 61 in opposed ears 60a and threaded into the corresponding blind holes in the casing, has small radial lips or inward flanges 60b on opposite sides to contain axially the outer race 57, a strip 62 of resiliently compressible material such as felt interposed between clamp 60 and the outer race, the thin metal washer 63 on the outboard side of the bearing, a felt washer 63a, and a washer-like portion of a seal member 66. The felt strip admits a degree of self-aligning character in the overall bearing and mounting structure therefor, and also serves as a noise reducing element.

Figure 2:
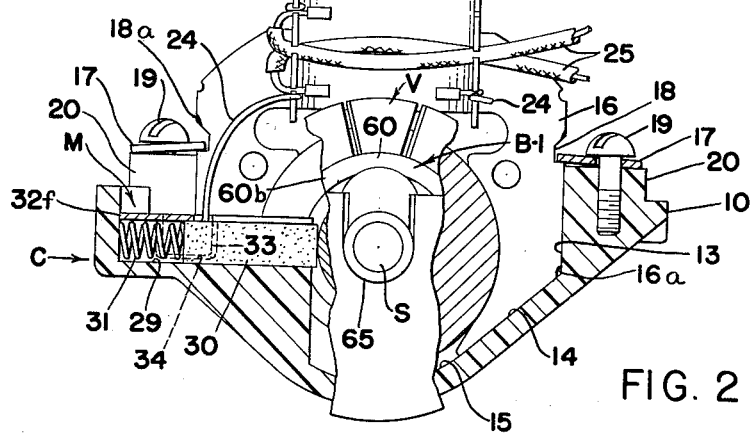
FIG. 2 is an end view partially in section with portions broken away as indicated by the line 2—2 in FIG. 1.
Figure 3:
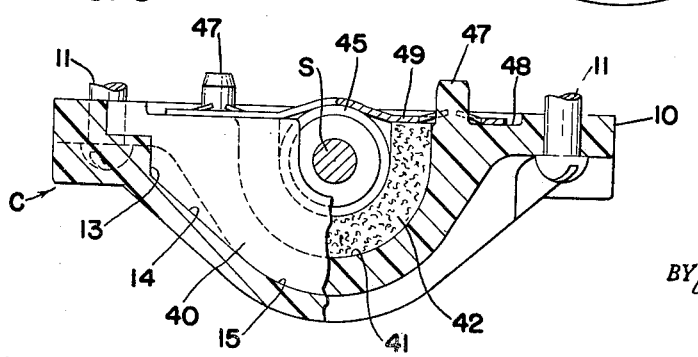
FIG. 3 is an irregular sectional view taken as indicated by lines 3—3 in FIG. 1.

As a cap for the casing slot 64 through which the shaft projects for mounting the pulley 65 press fitted thereon and drivingly engaging the brush belt Y, a molded nylon plastic dust seal member 66 is used (see FIG. 2). The seal 66 as an integral structure provides a washer-like portion received in the bearing seat recess 56 and also axially within the outer flange 60b of the bearing clamp; a block portion in slot 64 having a flat upper surface flush with the top of the casing flange 10, and a saddle-shaped lower surface spaced from the shaft; and an upward tab at the outer end of the block portion engageable with the depending wall formation W of housing H to which the motor unit is secured.

In the motor assembly above described the extended complementary or mating surfaces of the field or stator structure and of member C afford means to maintain the stator under the clamping forces of the screw-held clips 17 with certainty in definite relation to the casing member and other components, and this permits the use of such quite simple anchoring means as the stack-shoulder engaging screw-held clips. Obviously the stator stack laminations could be rivetted together rather than welded, or a stator core fabricated in some other fashion can be used as long as the clip-engageable shoulders are provided. This feature is of value not only where member C is moulded of an insulating plastic, but also where it is a die casting with the stack-mating surfaces, stack locating shoulders, bearing seat surfaces and bearing clip studs integrally formed in the die casting mold, or even a member fabricated of sheet metal formed as by stamping to have the shape described, either of which would be useful in a similar non-commutating motor unit, say of a two pole shaded-pole motor type.

Further with the bearing seats, shaft slot, fan well, brush slots with adjacent brush clip receiving slots, and the formations for securing the bearing retainers all integrally formed in proper relations by the molding fabrication of the casing member, the motor components are readily and correctly assembled into the final unit, in a fashion useful even where the motor enclosure is to be completed by structure independent of the environment of use, such as a second half-casing member with an open end surrounded by a flange similar to 10 whereby the casing members may be secured together by flange bolts.

By utilizing surrounding structure of the environment of use to complete the enclosure of motor components, if desired the overall design of the device incorporating the motor may often be reduced in size, or a higher rated motor of the instant invention may be used to replace a completely encased motor in an established design. In the specific application here discussed, the several components mounted on the base, excepting of course the pulley end of the shaft, are segregated from the vacuum space which is occupied by the agitator brush and traversed by dust ladened air in a domed chamber formed in the nozzle housing. Accordingly clean air may be drawn into the chamber through air inlet openings in the upper region of the dome at one side by fan V and discharged through corresponding exhaust openings on the other as indicated by the arrows in FIG. 4, thereby serving to cool the unit.

We claim:
1. A motor unit adapted to mounting in a housing having a space for receiving portions of the motor components and being bounded by a substantially continuous wall structure, said motor unit comprising: a mould-formed member providing a motor half-casing open on one side and recessed to accommodate a rotor and stator, a rotor on a shaft rotatably supported at opposite ends of the half-casing, a wound stator embracing the rotor having at least a portion thereof received in the recess of said half-casing, stator anchor means secured to the half-casing on opposite sides of said recess and engaged on respective shoulder formations of said stator to clamp the stator in the half-casing, said recess and said stator portion having mating complementary surface regions adapted to a wedging engagement under clamping pressures exerted by said anchor means, said half-casing including a peripheral portion around said recess adapted to be clamped in abutting relation to said wall structure of the housing.

2. A unit as described in claim 1, wherein at least part of the said surface regions of the half-casing terminate in one axial direction at an inward stator locating shoulder.

3. A unit as described in claim 1, including a rotor shaft bearing assembly adapted to locate axially the said rotor relative to said half-casing.

4. A unit as described in claim 1 including a self-aligning bearing at one end of the shaft with external spherical surface portions, a corresponding end wall of the half-casing having a recess providing a partial seat for said bearing, said end wall having integrally moulded parallel stud projections on opposite sides of the bearing seating recess, and a spring metal bearing retainer clip spanning the bearing and having stud receiving apertures engaged with said studs.

5. A unit as described in claim 1 comprising a commutating motor, wherein said member is formed of an insulating material and includes integrally moulded longitudinally aligned slots disposed radially to and on opposite sides of a commutator on said shaft, and at least one aperture in the casing adjacent each slot; said unit including in each slot a brush element and a brush spring biasing the brush into engagement with the commutator, and a brush retaining clip plate for each slot; each said plate comprising a body portion covering substantially the length of the respective slot to retain the brush and spring therein, and a barbed ear portion engaged in the corresponding said aperture to hold the plate in position.

6. A unit as described in claim 1 wherein said stator is comprised of a stack of punched like symmetrical laminations roughly U-shaped to define a two-pole field structure, said punchings having opposed notches on the exterior of the legs of the U forming longitudinal grooves in the assembled stack and to provide said shoulders and opposite said shoulders corners to be joined by a welding bead securing the laminations unitarily in said stack.

7. A unit as described in claim 6, wherein the said half-casing includes opposed parallel side wall interior surfaces extending parallel to the shaft and respective oblique bottom wall portions inwardly convergent to each other and parallel to the shaft.

8. A unit as described in claim 1, wherein said half-casing includes in one end wall an inward slot to receive an end of the shaft projecting therethrough and a seat for an outer race of an anti-friction bearing, an anti-friction bearing seated therein, a bearing clamp secured to the half-casing for retaining the bearing in said seat, and a dust seal element having a portion filling said slot to the level of said peripheral portion and an integral washer-like portion engaged outboard of said bearing between said seat and said clamp.

9. A unit as described in claim 8, including a motor ventilating fan interposed on said shaft between said end wall and said rotor, said half-casing having an integrally moulded recess to accommodate said fan.

10. A commutating motor unit adapted to mounting on a substantially continuous wall structure bounding a space for receiving portions of the motor components, said motor unit comprising: a member of moulded insulating plastic providing a base recessed and open on one side to accommodate an armature and field structure, an armature on a shaft rotatably supported at opposite ends of the base; a roughly U-shaped field having a wound yoke portion and leg portions forming two opposed poles, the leg portions being at least partially received in the recess of said base and the wound yoke being located outside the recess, field anchor means secured to the base on opposite sides of said recess and in clamping engagement on respective shoulder formations of said field, said recess and said leg portions having mating complementary surface regions adapted to a wedging engagement under clamping pressures exerted by said anchor means; said member including integrally moulded longitudinally aligned brush slots disposed radially to and on opposite sides of a commutator on said shaft, and a pair of narrow slots in the casing adjacent and on opposite sides of each brush slot; in each slot a brush and a brush spring biasing the brush into engagement with the commutator; and a brush retaining clip plate for each brush slot; each said plate comprising a body portion covering substantially the length of the respective slot to retain the brush and spring therein and a pair of integral barbed ears bent at right angles to the body portion engaged in corresponding said narrow slots to hold the plate in position.

11. In a motor unit the combination of: a formed member providing a half-casing of the motor recessed and open on one side to accommodate a rotor and a stator structure; a rotor on a shaft rotatably supported at opposite ends of the half-casing; a roughly U-shaped stator having a wound yoke portion of the U and leg portions forming two opposed poles embracing the rotor, the leg portions being at least partially received in the recess of said half-casing and the wound yoke being located outside the half-casing; and stator anchor means secured to the half-casing on opposite sides of said recess and in clamping engagement on respective shoulder formations of said stator, said recess and said leg portions having mating complementary surface regions adapted to a wedging engagement under clamping pressures exerted by said anchor means; said member including integrally formed bearing seat recesses at opposite ends thereof and a peripheral formation on the open side thereof adapted to be secured to a structure providing additional enclosure for components of the motor assembled on said member.

12. A unit as described in claim 11, wherein at least part of the said surface regions of the half-casing terminate in one axial direction at an inward stator locating shoulder.

13. A unit as described in claim 11, including a rotor shaft bearing assembly adapted to locate axially the said rotor relative to said half-casing.

14. In a motor unit as described in claim 11, said member including a semi-cylindrical seat for receiving the outer race of an anti-friction bearing; an anti-friction bearing in said seat; a bearing retainer clamp of generally semi-cylindrical form embracing a portion of said outer race projecting from said seat, said clamp having diametrically extending portions secured to said member; and a strip of compressible resilient material interposed between said outer race and said clamp, to permit at least a limited self-alignment of said bearing.

15. A unit as described in claim 11 wherein said stator is comprised of a stack of punched like symmetrical laminations roughly U-shaped and secured together to define a two-pole stator core, said punchings having opposed notches in the exterior of the legs of the U thereby forming longitudinal grooves in the assembled stack and to provide said shoulders.

16. In a device including a casing element and a shaft rotatably mounted relative to said casing element the combination of an anti-friction bearing for the shaft having an outer race, a semi-cylindrical seat in the casing element receiving said outer race, a bearing retainer clamp of generally semi-cylindrical form to embrace a portion of said race projecting from the seat, and diametric lugs secured to the casing, and a strip of compressible resilient material interposed between outer race and clamp providing at least a limited self-alignment of the bearing.

References Cited in the file of this patent

UNITED STATES PATENTS

| | | |
|---|---|---|
| 2,613,242 | Shumaker et al. | Oct. 7, 1952 |
| 2,763,802 | Dolan | Sept. 18, 1956 |
| 3,023,332 | Charles | Feb. 27, 1962 |